Figure 2A:
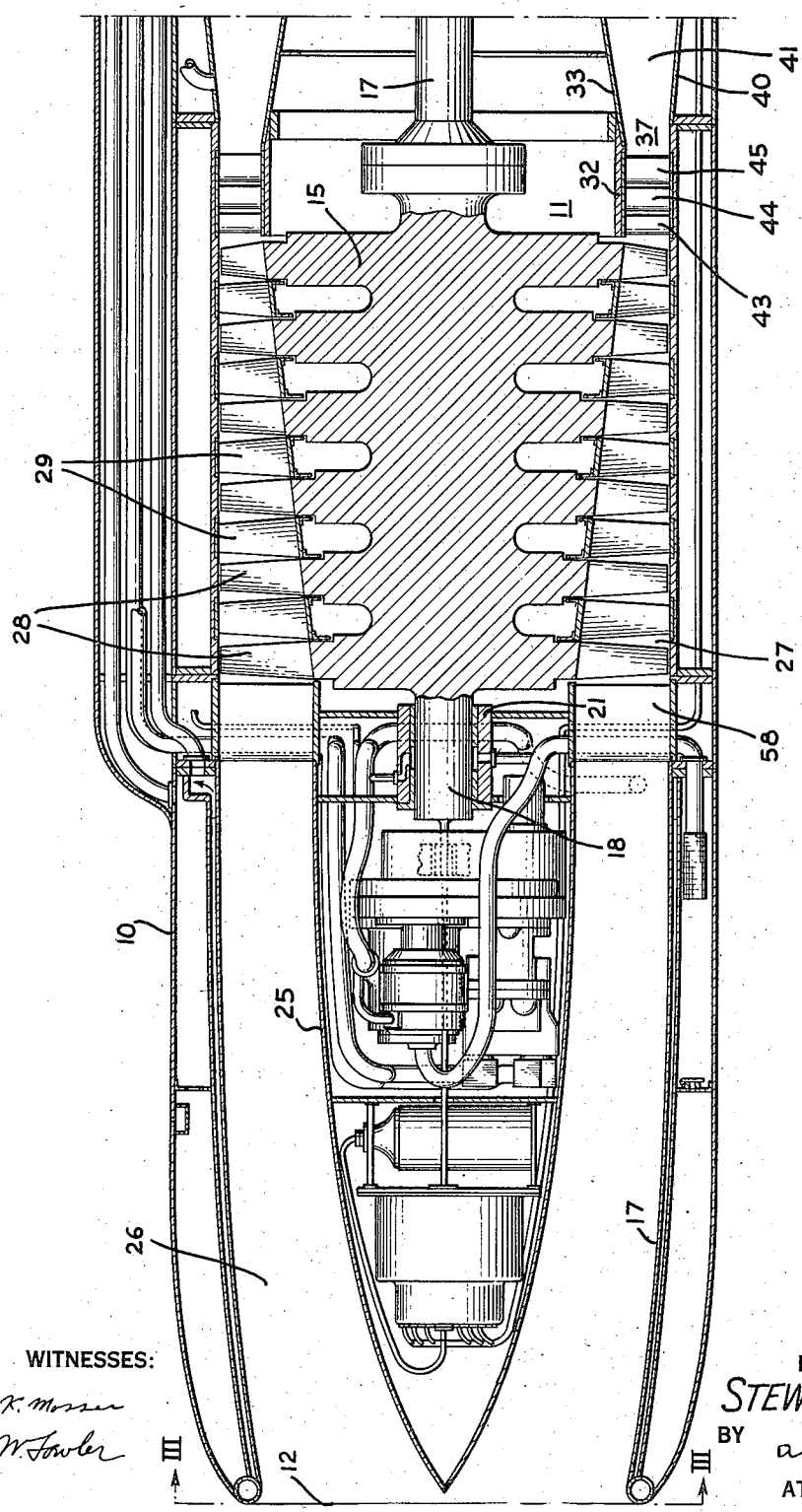

Aug. 13, 1946.  S. WAY  2,405,723
PROPULSION APPARATUS
Filed April 10, 1943  3 Sheets-Sheet 1
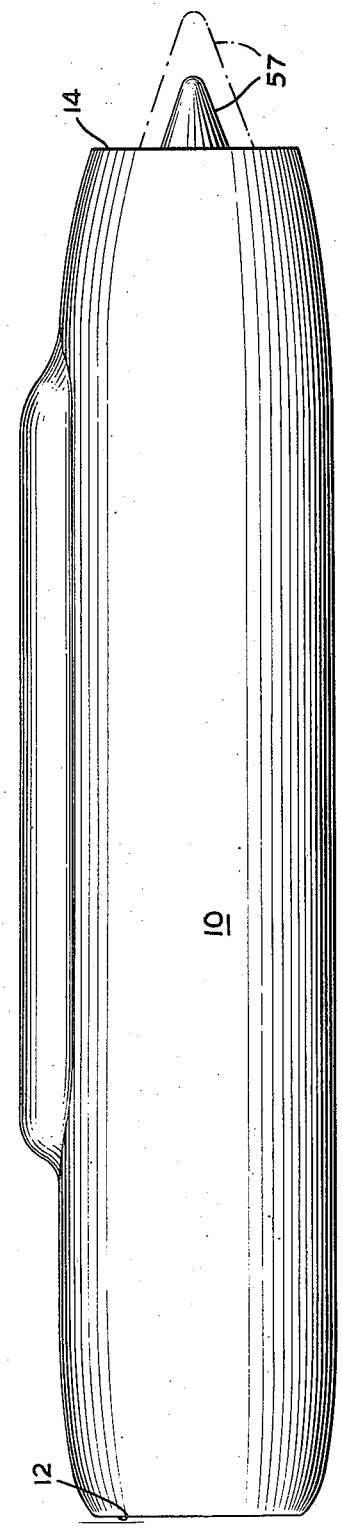
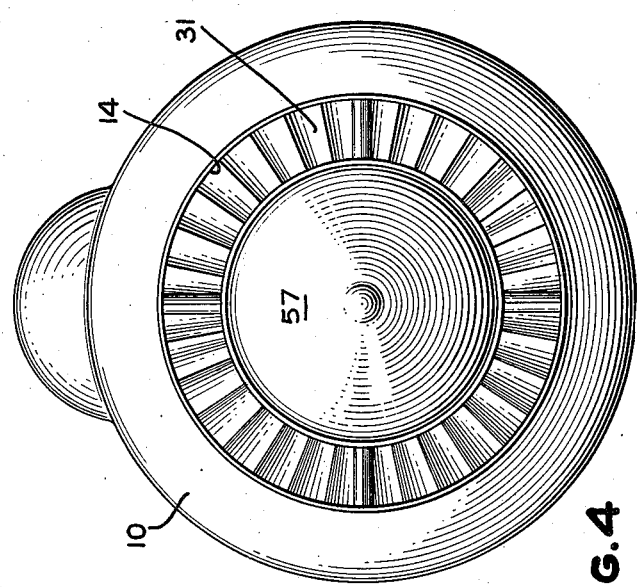
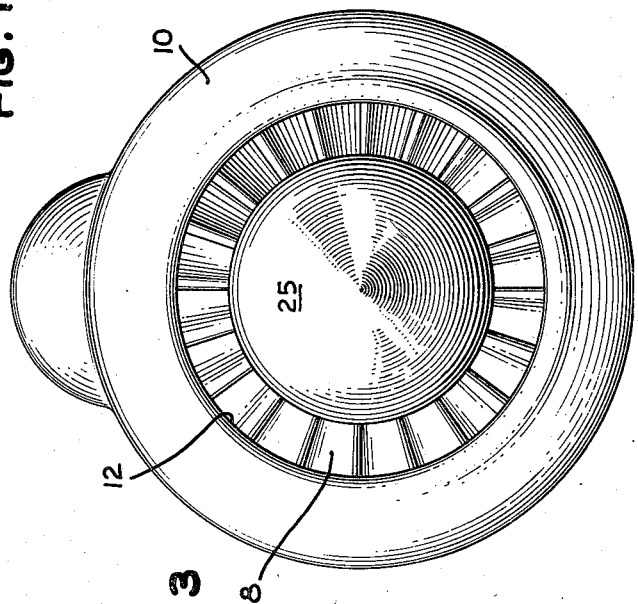
INVENTOR
STEWART WAY
BY
ATTORNEY

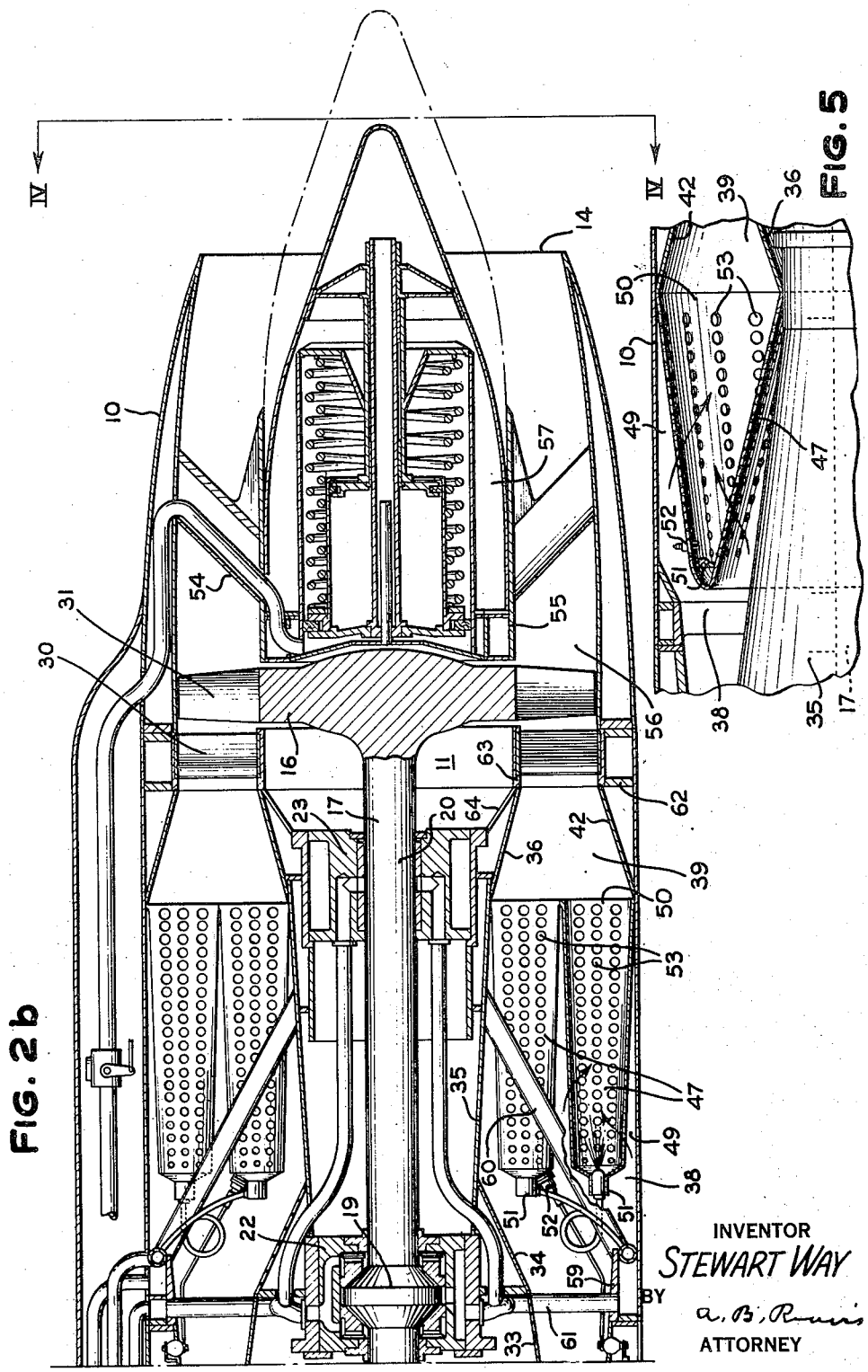

Patented Aug. 13, 1946

2,405,723

UNITED STATES PATENT OFFICE 2,405,723

PROPULSION APPARATUS

Stewart Way, Pittsburgh, Pa., assignor to Westinghouse Electric Corporation, East Pittsburgh, Pa., a corporation of Pennsylvania Application April 10, 1943, Serial No. 482,533

1 Claim. (Cl. 60—35.6)

The invention relates to a gas turbine plant including a compressor driven by a turbine with a combustion chamber arranged therebetween, and it has for an object to improve apparatus of this character so as to reduce the pressure drop over the combustion chamber and to utilize the air supply for the combustion chamber to protect structure of the plant against overheating due to high temperatures existing in the combustion chamber.

A more particular object of the invention is to provide a gas turbine plant wherein the combustion chamber between an axial flow compressor and an axial flow turbine is divided into a burner space axially overlapped inwardly and outwardly by an air space which supplies air to the burner space to support combustion in the latter and which utilizes the air to protect parts of the plant against the intense heat existing in the burner space.

In my application, Serial No. 403,942, filed July 25, 1941, there is disclosed and claimed a jet plant including a forward diffuser, an intermediate combustion chamber, and a rearward converging nozzle. Such a plant requires very high flight speeds for good efficiency. The present invention is an improvement thereover in that, by the introduction of a forward axial flow compressor and a rearward gas turbine into the tubular element thereof, good efficiency may be had at lower flight speeds, the required compression being obtained to a very large extent by turbine energy supplied to the compressor instead of altogether on account of the propulsion or flight speed. The diffuser and converging nozzle features of the plant disclosed in said application are preserved; however, the incorporation of the compressor and turbine introduced certain problems that had to be met. The combustion means must be capable of being installed in the space between the compressor and the turbine with minimum over-all axial length of the plant and minimum outside diameter thereof and of giving a sufficiently high rate of heat release to meet the requirements; it must provide for maximum propulsion jet velocity; and the casing structure, the shaft connecting the compressor and turbine rotors, and the bearings for supporting the shaft from the casing structure must be protected against overheating on account of the nearness thereto of the burner space. To satisfy these requirements, there is provided a wall structure dividing the combustion chamber into a burner space which diverges toward the turbine and into an air space which axially overlaps the burner space both inwardly and outwardly and the wall structure has openings providing for distributed admission of air from the overlapping air space to the overlapped burner space so that the air in the air space may protect the casing construction, the connecting shaft, and the bearings for the latter against overheating. By having the wall structure separating the burner and air spaces coned, the burner space may diverge in the direction of flow so as to minimize the pressure drop therein. Also, this feature, taken with the provision of adequate air openings, assures of a very small deviation in the direction of flow with the result that flow from the compressor to the turbine is substantially straight. With liquid fuel supplied to atomizers and the latter operating to discharge an atomized spray of fuel particles into the forward end of the diverging burner space, the air admission openings formed in the wall structure may be distributed along the latter to secure stable burning at the forward end of the burner space, because of the low velocity due to the small amount of air entering the forward end, and to secure continuous dilution of the fuel and air mixture to complete combustion and to provide gaseous motive fluid of desired temperature and of the maximum pressure at the burner outlet.

These and other objects are effected by the invention as will be apparent from the following description and claim taken in connection with the accompanying drawings, forming a part of this application, in which:

Fig. 1 is a side elevational view of the improved propulsion power plant;

Figs. 2a and 2b taken together constitute a longitudinal sectional view, drawn to larger scale, of the plant shown in Fig. 1;

Figs. 3 and 4 are sectional views taken along the lines III—III and IV—IV of Figs. 2a and 2b, respectively, viewed, respectively, in the direction of the arrows; and Fig. 5 is a fragmentary sectional view showing a further form of combustion apparatus.

In the drawings, there is shown tubular casing structure, at 10, which is given a rounded taper toward each end to provide for streamlining. A composite core structure, generally indicated at 11, is supported internally of the casing structure by the latter, and it cooperates therewith to define an annular flow passage extending from the inlet or forward end 12 of the plant to the exit or discharge end 14 thereof, the arrangement being such that the passage is substantially straight or axial and involves a minimum of change in direction or sudden changes in flow area.

The composite core structure, at 11, includes a compressor rotor 15 and a turbine rotor 16 spaced rearwardly therefrom. The coaxial rotors are connected by shaft 17, thereby providing a spindle structure or aggregate; and such spindle structure is formed with journal or bearing portions cooperating with bearings carried internally by the casing structure so that it may be maintained in coaxial relation with respect to the latter and in a predetermined axial position with respect thereto. To this end, the compressor rotor has a journal portion 18 extending forwardly thereof and the connecting shaft 17 has a double conical combined radial and thrust bearing portion 19 and a journal portion 20 arranged between the rotors. The journal or bearing portions 18, 19 and 20 are carried, respectively, by bearings 21, 22 and 23 supported internally of the casing structure, at 10.

Forwardly of the compressor rotor 15, the core structure includes a fairing cone 25 supported by the casing internally thereof. The fairing cone covers the frontal area of the compressor rotor 15, it encloses the bearing 21, and it cooperates with the casing structure to define an annular entrance passage 26 for the converging compressor passage 27.

The compressor rotor and the casing structure carry, respectively, a plurality of alternately arranged rotating and stationary blades 28 and 29, arranged in the passage 27 and defining a multiplicity of axial-flow stages, the blades diminishing in height in the direction of flow suitably to the convergence of the passage 27. The axial-flow turbine includes cooperating stationary and moving rows of blades 30 and 31 carried by the casing structure, at 10, and by the rotor 16, respectively.

The core structure, at 11, also includes interior tubular wall elements 32, 33, 34, 35, and 36, which cooperate with the casing structure, at 10, to define an intermediate portion of the annular passage arranged between the rotors 15 and 16 and connecting the compressor discharge area to the turbine inlet area. The intermediate portion of the annular passage includes a diffuser section, indicated generally at 37, connected by a combustion chamber section 38 to a nozzle section 39.

The casing structure, at 10, embodies an interior rearwardly-divergent tubular wall element 40 which cooperates with the rearwardly-convergent wall element 33 to provide a divergent diffuser passage part 41 of the diffuser, indicated generally at 37. The wall element 36 diverges rearwardly and cooperates with a convergent wall element 42 carried by the casing structure to define an annular nozzle 39 communicating with the discharge end of the combustion space and having suitable convergency for expansion of motive fluid for the turbine.

As shown, the diffuser, at 37, includes a plurality of rows of stationary blades or vanes 43, 44 and 45 which function to change gradually the direction of the stream issuing from the compressor with a tangential component to a direction which is substantially entirely axial; and, in so doing, the turning vanes effect diffusion, a substantial portion of the tangential component of velocity being converted into pressure. Velocity of the axial-flowing stream issuing from the tangential diffuser then enters the axial diffuser passage 41, wherein axial velocity is converted into pressure, and which supplies the air so compressed to the intermediate combustion chamber 38.

The combustion chamber 38 is divided by wall structure 47 into an overlapping compressed air space 49 open to the discharge end of the diffuser passage 41 and into an overlapped burner space or spaces 50 open to the nozzle passage 39. As may be seen from Figs. 2b and 5, the wall structure may be constituted by any suitable means so long as it separates an axially-converging air space from an axially-diverging burner space and provides openings for flow of air from the first space into the second. Fuel is supplied to suitable atomizers 51 located at the forward end or ends of the burner space or spaces provided with ignition devices 52, and the wall structure has openings 53 formed therein and disposed therealong to provide for entry into the burner space or spaces 50 of compressed air from the overlapping air space 49, the entering air supporting combustion of fuel and mixing with the hot products of combustion to provide a mixture of air and products of combustion of suitable temperature for turbine operation. The structure 47 separating the air and burner spaces may be constituted in any suitable manner provided that it is disposed so that the air space overlaps axially the burner space and so that air may flow into the latter along the structure to enable combustion to be completed, or substantially completed, within the axial length of the burner space. In this way, not only is the axial length of the apparatus kept at a minimum, but it does not require the separation of a primary combustion air stream from the main stream leaving a remaining secondary air stream to be mixed therewith. The initially fuel-rich air-fuel mixture is gradually and continuously diluted with greater and greater quantities of air; and, as this takes place, combustion is completed. Thus, there is avoided any subsequent mixing of hot and cold streams, combustion being completed and the products being diluted in the burner space, whereby the apparatus as a whole is compact and the axial length is minimized. The separating structure is furthermore arranged to provide for an air space which converges and a burner space which diverges in a downstream direction. Also, the inlet area of the openings 53 is greater than the exit area of the burner space. Thus, there is provided a combustion chamber wherein minimum deviation in the direction of flow occurs in passing from the air space to the burner space, substantially uniform gas velocity is maintained throughout the passageway of the air and burner spaces, the length of the combustion chamber is minimized because of combustion being completed or substantially completed in the burner space, and the pressure drop of the combustion chamber is relatively very small.

The compressed and heated motive fluid issuing from the burner space or spaces 50 enters the entrance of the nozzle passage 39 and undergoes expansion in the latter with conversion of heat energy into velocity energy to provide an annular stream of suitable velocity for action on the turbine blading 30 and 31, so that a portion of such velocity energy may be abstracted by the latter.

Rearwardly of the turbine, the casing structure, at 10, supports, by radial struts 54, the stationary core element 55, which cooperates with the casing structure to define the annular nozzle passage 56 whose inlet area is common with the turbine exhaust or discharge area. Normally, the nozzle passage 56 receives motive fluid at the turbine residual velocity and expands such fluid with further conversion of heat energy into velocity energy to increase the velocity to provide the propulsion jet; and, as the propulsion jet discharges to atmosphere, the expansion ratio of the nozzle passage 56 should be so chosen as to suit operating conditions and secure the most effective propulsion. Therefore, provision is made for variation in the nozzle discharge area, this result being accomplished by means such as disclosed and claimed in the application of D. Bradbury, Serial No. 507,090, filed October 21, 1943, and assigned to the Westinghouse Electric Corporation. Such means preferably includes a conical tail piece 57 which telescopes within the core structure 55 and is adjustable axially of the latter to change the nozzle exit area. With the tail piece in its extreme forward position, shown in full lines in Figs. 1 and 2b, the exit area of the nozzle passage 56 may be somewhat greater than the inlet area thereof, this being the desirable condition for starting when the nozzle should impose the minimum back pressure on the turbine. As the tail piece 57 is moved rearwardly, the nozzle exit area is diminished; and, when it reaches the extreme rearward position, indicated in dot and dash lines in these figures, the nozzle exit area is smaller to a desired extent than the inlet area to provide for a suitable expansion ratio with substantial conversion of heat energy into velocity energy to provide for a more and more effective propulsion jet. During the starting period, because of the relatively large nozzle exit area provided to minimize back pressure on the turbine, the nozzle does not provide a very effective propulsion jet; however, after starting and with the apparatus in operation, the tail piece is adjusted rearwardly to diminish the nozzle discharge area, so that the nozzle becomes more and more effective as a means for expanding motive fluid with conversion of heat energy into velocity energy with consequent increase in propulsive effectiveness of the jet.

As shown, the front bearing 21 is preferably supported from the interior of the casing structure, at 10, by means of a row of compressor guide vanes 58 forming a spider-like structure carrying the bearing, and the fairing cone 25 is supported by this spider-like structure so as to cover the frontal area of the compressor rotor and enclose the bearing, this arrangement being disclosed and claimed in the application of J. E. Chalupa, Serial No. 494,007, filed July 9, 1943, and assigned to the Westinghouse Electric Corporation. The combined radial and thrust bearing 22 is preferably supported by a stress construction forming a part of the casing structure, and more particularly disclosed and claimed in the application of R. P. Kroon, Serial No. 474,093, filed January 30, 1943, and assigned to the Westinghouse Electric Corporation, this stress construction also cooperating with the tubular element 35 of the combustion chamber and with the stationary turbine vanes 30 to support the bearing 23. As disclosed in said application, the casing structure embodies a relatively stiff and strong circular stress element 59 joined by struts 60 to the bearing 22, the bearing 22 being connected to the bearing 23 by the sleeve element 35 and bracing struts 60 in the air space 49 having their ends attached to the stress ring 59 and to the sleeve 35 so as to form a rigid stress structure for supporting the bearings. The bearing 23 is additionally supported by elements connected to the turbine guide vanes 30, this purpose being achieved by providing a second relatively stiff and strong circular stress element 62 forming a part of the casing construction and to which are attached the outer ends of the blades or vanes 30, the inner ends of the latter being attached to the inner ring 63 which is connected by the conical plate 64 to the adjacent end of the bearing 23. Thus, the bearing 23 is supported from both stress ring constructions 59 and 62 by structure assuring of adequate stiffness and rigidity for maintaining the bearings 22 and 23 in correct relative relation.

From the foregoing, it will be apparent that I have provided a power plant of streamlined form which may be dimensioned for relatively small maximum diameter, large power-developing capacity and high efficiency for a given peak temperature. A relatively small maximum diameter follows for the use of components wherein flow is generally axial, the arrangement of such components so that substantially straight-through axial-flow occurs from end to end of the plant, and the use of structure connecting the turbine and the compressor both statically and dynamically and which provides for burner space or spaces overlapped axially by the air space with the result that high combustion rates may be had and the connecting structure protected or insulated by the air from the effects of high combustion temperatures. Aside from the protecting effect provided by the air being conducive to a relatively small diameter of the connecting structure, this result is furthered by the capacity of the overlapping arrangement of air and burner spaces providing for high combustion rates, fuel being supplied to the front end or ends of the combustion space or spaces and air being admitted to the latter through openings disposed along the separating wall structure so as to effectively support combustion of the fuel and to admix with the hot products of combustion to provide for motive fluid issuing from the burner space or spaces at temperatures suitable for turbine operation. By having the air space overlapping the burner space, not only do the aforementioned advantages follow, but there is preserved the in-line, straight-through flow arrangement of minimum length and one which operates at the best efficiency for a given peak temperature, the structures separating the air and burner spaces being so arranged as to provide for minimum deviation in the direction of the flowing air and for the admission of air to the burner space so that combustion may be completed or substantially completed within the axial length of the latter, whereby the length of the combustion chamber, and, therefore, the over-all length of the plant, may be kept at a minimum. Furthermore, the small change in direction of flow of air incident to passage from the air space to the burner space, coupled with the copious area provided for that purpose, assures of the combustion chamber having a minimum pressure drop with the result that the available energy of the motive medium is usefully employed to the best advantage.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

What is claimed is:

In apparatus for generating gaseous motive fluid for a jet propulsion nozzle, an axial flow compressor including a stator and a rotor; an axial flow turbine axially aligned with the compressor, spaced axially from the latter, and including a stator and a rotor; a shaft connecting the compressor and turbine rotors to constitute a spindle aggregate; bearings for the spindle aggregate and including a pair of bearings for said shaft with the turbine rotor overhanging the adjacent one of the latter bearings so that the entire space at the discharge side of the turbine rotor is left free for accommodation of the jet propulsion nozzle; a casing structure supporting said compressor and turbine stators; means including a tubular wall structure carried interiorly by the casing structure between the compressor and the turbine and cooperating with the casing structure to define an annular passage connecting the compressor outlet to the turbine inlet; said tubular wall structure telescoping said connecting shaft in spaced relation and interiorly supporting said pair of bearings; said annular passage including a diffuser section, a combustion chamber section, and a nozzle section with the diffuser section diverging in the direction of flow from the compressor outlet to the combustion chamber section and the nozzle section converging in the direction of flow from the combustion chamber section to the turbine inlet; burner space wall structure dividing the combustion chamber section into circumferentially-disposed burner and air spaces with the burner space open to the nozzle section, the air space open to the diffuser section, and the air space enveloping axially the burner space; said burner space wall structure being of conical conformation so that the burner space diverges in the direction of flow toward the turbine and the enveloping air space converges in the same direction; and a circumferential series of atomizers carried by the forward portion of said burner space wall structure and receiving liquid fuel and discharging atomized fuel into the forward end of the burner space; said burner space wall structure having openings distributed therealong and thereover and providing for flow of air from the enveloping air space to the enveloped burner space substantially throughout the length of the latter to support combustion of atomized fuel and admix with the products of combustion to form gaseous motive fluid of suitable temperature for the turbine and, in flowing over the air space boundary surfaces provided by the casing and tubular wall structures and by the burner space wall structure, to limit the temperature of all of such structures.

STEWART WAY.